United States Patent [19]

Schiler

[11] 3,845,993
[45] Nov. 5, 1974

[54] RECIRCULATING BALL FLAT WAY BEARING ASSEMBLY

[75] Inventor: Frederick S. Schiler, Stow, Ohio
[73] Assignee: Portage Machine Company, Akron, Ohio
[22] Filed: Aug. 31, 1973
[21] Appl. No.: 393,422

[52] U.S. Cl. .................................................. 308/6
[51] Int. Cl. .......................................... F16c 31/04
[58] Field of Search ................................ 308/185, 6

[56] References Cited
UNITED STATES PATENTS
3,758,176  9/1973  Stapley ............................... 308/6 C Primary Examiner—Charles J. Myhre
Assistant Examiner—Frank Susko
Attorney, Agent, or Firm—Freeman & Taylor

[57] ABSTRACT

A recirculating ball flat way bearing assembly for facilitating movement between two relatively heavy objects such as, for example, a grinder or milling machine and a way. The components of the bearing assembly include a base plate having recessed side areas and partial opposed bearing tracks on each side surface. A body portion is also provided having recessed sides and partial opposed tracks. A guide member with arcuate ends is adapted to be secured to the base, with the housing then being received over the parts thus assembled so that the partial tracks on the opposed sides of the base plate and on the opposed sides of the housing will, in cooperation with the arcuate ends of the guide member, serve to form an endless run or race for a plurality of opposed balls received therewithin. Means are provided for securing the three components together, and a U-shaped telescoping cover plate is also provided which has its base slid over the top of the body portion and has inturned bottom flanges which partially enclose the bearings when they are in the bottom run, thereby preventing dislodgement of the same.

5 Claims, 4 Drawing Figures

PATENTED NOV 5 1974 3,845,993

RECIRCULATING BALL FLAT WAY BEARING ASSEMBLY

BACKGROUND OF THE INVENTION

This invention relates, in general, to the art of bearings and, in particular, relates to a recirculating ball flat way bearing assembly intended to be used to facilitate movement between two relatively heavy objects. An example would be a milling or grinding machine or any heavy machine that moves linearly. The invention is not, however, intended to be limited to use with any specific type of machinery and is believed apparent that it would have many additional uses.

DESCRIPTION OF THE PRIOR ART

The following prior art is known to applicant: Stark U.S. Pat. No. 3,003,828 Stallman U.S. Pat. No. 3,101,978 Newman U.S. Pat. No. 3,467,447.

While these patents disclose recirculating bearings of the general type referred to herein, none have the simplicity of construction disclosed in this application which results in economy in manufacturing without any sacrifice of operational efficiency.

SUMMARY OF THE INVENTION

Considerable difficulty is encountered, as is well known, in facilitating movement between relatively heavy objects such as grinders, milling machines, and other devices which have linearly reciprocal ways. In the past, some of the difficulties encountered have been overcome by the provision of a self-contained ball way package which tends to reduce friction and facilitate movement.

Heretofore, however, these packages or assemblies have required considerable machining and have been relatively complex in nature.

Accordingly, it has been discovered that a simplified assembly can be provided consisting of, in reality, only five main components which can be machined with relative ease, but which will accomplish the object, namely, the smooth and easy relative movement between the two objects.

It has been discovered that such an assembly can be produced by providing a flat base plate which is reduced in width intermediate its ends and which has partial opposed ball runs formed therein. A body portion is also provided which has corresponding partial ball runs and a reduced width central portion.

Interposed between these first two components is a guide member consisting of a flat plate having arcuate ends and which overlies the partial runs on the base plate and underlies the partial runs on the body portion.

It has been discovered that an endless string or row of ball bearings can be placed in the appropriate runs and the three parts secured together following which a U-shaped cover plate can be slipped over the components thus assembled. The cover plate has partial inturned flanges on the outboard ends of its opposed legs and will serve to retain the string of balls in the runs when assembled.

Accordingly, production of an improved bearing assembly having the above-noted characteristics becomes the principal object of this invention, with further objects thereof becoming more apparent upon a reading of the following brief specification, considered and interpreted in view of the accompanying drawings.

OF THE DRAWINGS

BRIEF DESCRIPTION OF THE PREFERRED EMBODIMENTS

Figure 1:
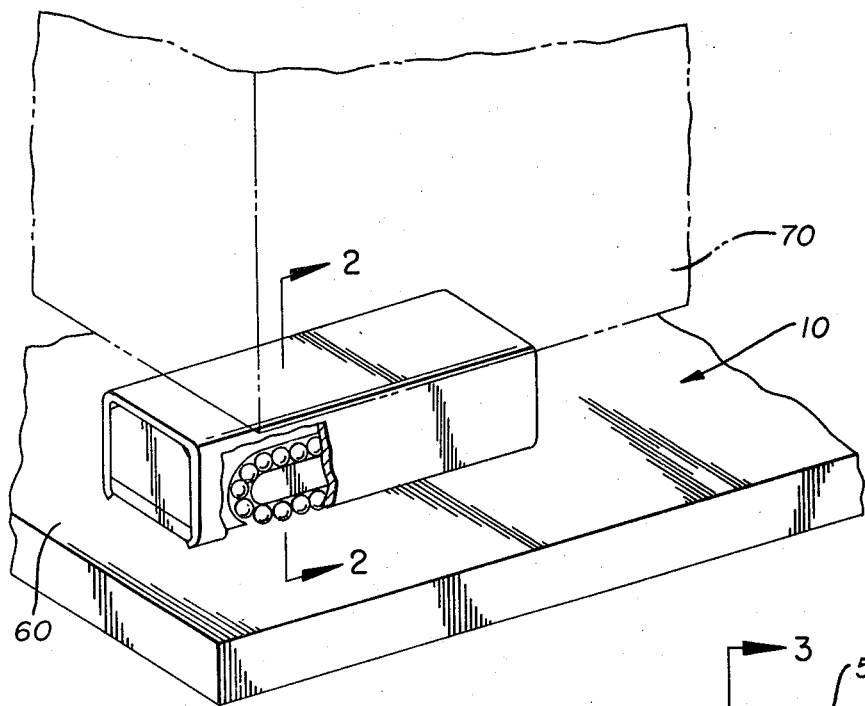
FIG. 1 is a perspective view partially broken away showing, in partial schematic fashion, the bearing assembly in place.

Referring then to the drawings, it will be noted that the bearing assembly, generally indicated by the numeral 10, consists of a minimum of relatively simple components, yet when assembled, provides a very effective bearing assembly.

The principal components are the base plate 11, the guide member 20, the body 30, the opposed strings of balls 40 and 41, and the cover plate 50.

Figure 4:
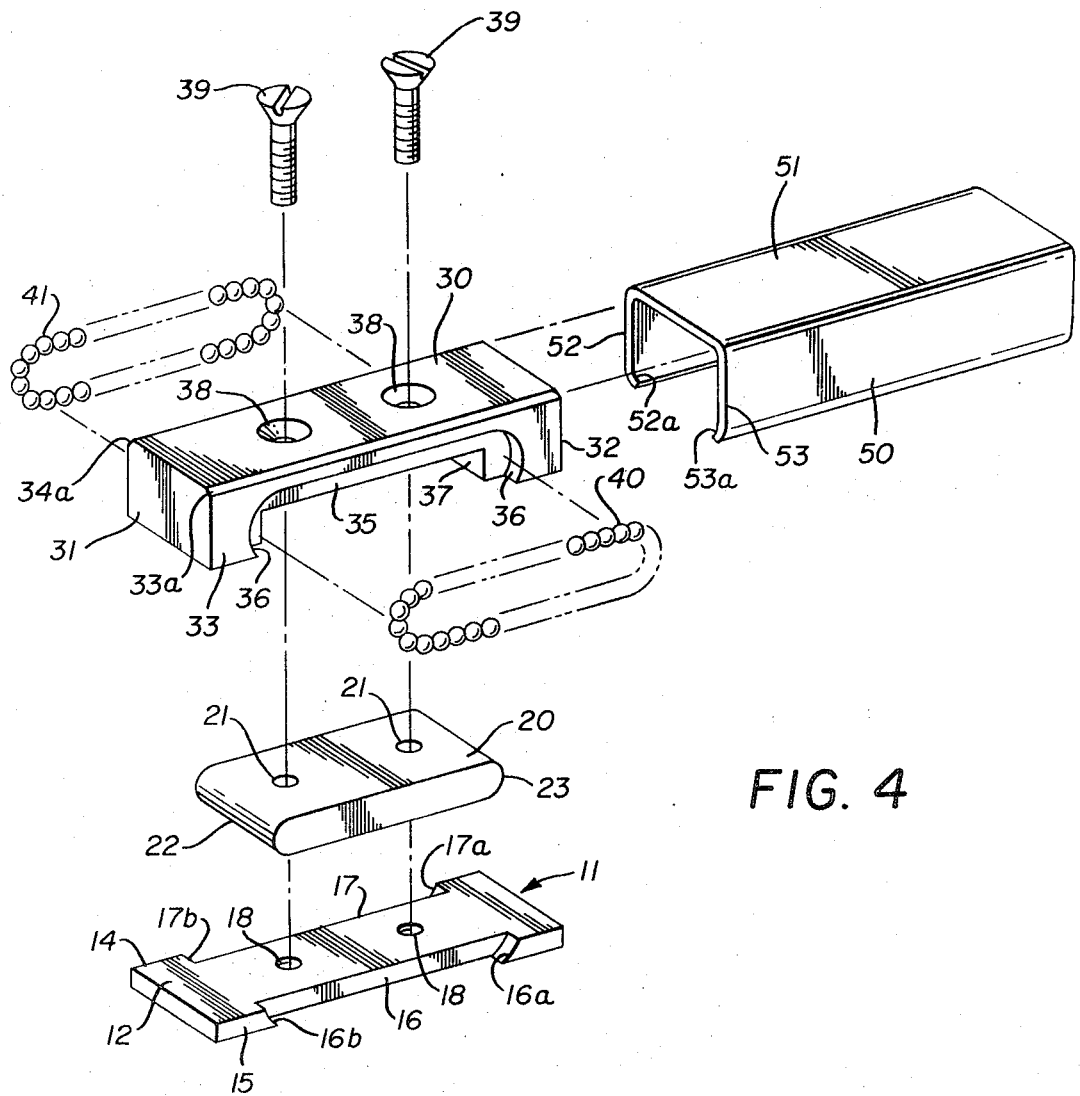
FIG. 4 is an exploded view showing the various components of the assembly and their relative positions with regard to each other.

With reference particularly to FIG. 4, it will be noted that the base plate 11 is a generally flat, rectangular piece of metal having a top surface 12 and a bottom surface 13 and opposed side surfaces 14 and 15.

The side surfaces 14 and 15 are reduced in transverse dimension to form recessed areas 16 and 17 on the opposed sides extending throughout a substantial portion of the length of the base plate 11. On each side 16 and 17, the shoulder or point of juncture between the widest portion of the side walls 14 and 15 and the recessed portions 16 and 17 are ground to form partial runs or races for the balls, with these partial runs being indicated at 16a, 16b, 17a, and 17b. The base plate 11 is further completed by the provision of threaded apertures 18,18, the purpose of which will be explained subsequently.

Figure 3:
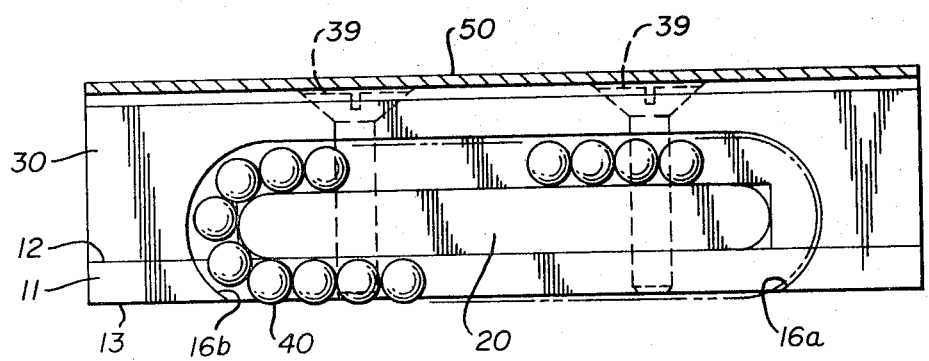
FIG. 3 is a sectional view taken along the line 3—3 of FIG. 2.

Referring again to FIG. 4 primarily, the guide member 20 will be shown to be a flat, metal plate having apertures 21,21 which are threaded and which are intended to be aligned with the apertures 18,18 of base plate 11 as shown, for example, in FIG. 3.

The opposed ends 22 and 23 of the guide member 20 are ground to an arcuate configuration, and the overall width of the member 20 is such that when it is placed on top of the base plate 11, these ends will extend to the widest transverse dimension of the base plate and will overlie most of the length dimension of the recessed areas 16 and 17 of the base plate. Reference to FIG. 3 will show, however, that the ultimate end of the guide member falls slightly short of the end of the partial races 16a, 16b, 17a, and 17b.

Still considering FIG. 4, the body portion 30 is shown as having opposed ends 31 and 32 and opposed side surfaces 33 and 34. This body portion 30 also has at least a portion of the height of its side walls recessed in a transverse dimension to form the reduced width areas 35,35 as shown in FIG. 4. A partial race or run for the balls is indicated by the numerals 36,36 as shown in FIG. 4, and it should be noted that a similar race appears on the opposed side of the body portion. Furthermore, the body portion 30 is undercut from its bottom surface as at 37 for purposes which will be described below. Completing the description of the body portion 30, it will be noted that countersunk bores 38,38 are provided for reception of screws 39,39, with these bores being spaced so as to be in alignment with the bores 21,21 of the guide member 20 and the bores 18,18 of the base plate 11. The body portion also has chamfered surfaces 33a,34a along its top edges.

The cover plate 50 is shown in FIG. 4 as being of generally U-shaped configuration having a base 51 and depending legs 52,53 which end in inturned flanges 52a,53a.

Finally, two strings of balls 40 and 41 are illustrated.

Referring then to FIG. 3, it will be noted that, when assembled, the device consists of the base plate 11 to which is bolted or screwed the guide member 20, with the guide member 20 extending in transverse dimension so as to overhang the reduced width areas 16 and 17 of the base plate 11. The body portion 30 is screwed on to the assembly thus formed in the manner shown in FIG. 3, with undercut area 37 receiving guide member 20 as shown and with the partial runs 36,36 cooperating with the paRtial runs 16a, 16b, 17a, and 17b to form an endless track for the balls 40 and 41.

Figure 2:
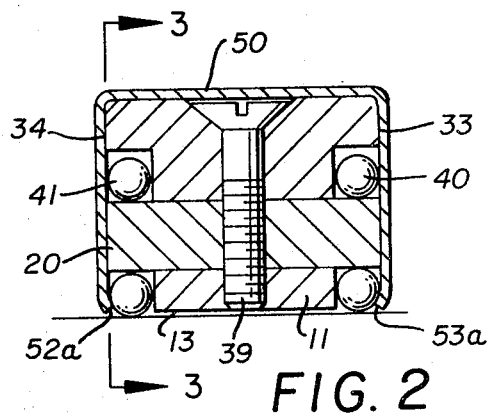
FIG. 2 is a sectional view taken along the line 2—2 of FIG. 1.

The cover plate 50 is then telescoped over this assembly, with such telescoping being facilitated by chamfered edges 33a,34a on the body portion 30, and by virtue of the inturned flanges 52a,53a, the balls, as shown in FIG. 2, will be held in place when they are in what may be called the bottom or active run position. The flanges 52a,53a, however, are dimensioned so that the balls are still able to contact the way or other supporting surface 60 as shown in FIG. 2.

In operation, it is believed apparent that the cover plate 50 may be affixed to the heavy object which is to be moved, which is schematically illustrated in FIG. 1 and referred to by the numeral 70. The bottom run of the balls will rest on the way which is again schematically illustrated in FIG. 1 and referred to by the numeral 60. In this way the balls will be in contact with the way and will facilitate movement of the object 70 across the way 60. The balls are retained in their proper place at all times, and no alignment problems are contemplated by virtue of the construction of the runs for the balls and also by virtue of the inturned flanges of the cover plate.

Accordingly a much simplified, easy to manufacture, yet efficient bearing assembly has been provided.

While a full and complete description of the invention has been set forth in accordance with the dictates of the Patent Statutes, modifications may be resorted to without departing from the spirit hereof or the scope of the appended claims.

What is claimed is:

1. A recirculating bearing assembly comprising;
  A. a base plate having opposed partial ball runs therein;
  B. a guide member secured to said base plate;
  C. a body portion
    1. secured to said base plate and said guide member and
    2. having opposed partial ball runs which cooperate with said guide member and said partial ball runs of said base plate to form opposed endless ball runs;
  D. a plurality of ball bearings received in said endless ball runs; and
  E. a cover plate
    1. telescopically received over said body portion, said guide member, and said base plate, and
    2. including means for retaining said balls in place for at least a portion of the length of said endless ball runs.

2. The assembly of claim 1 wherein said base plate
  A. is substantially flat and rectangular in plan;
  B. has opposed, reduced width portions extending through a portion of its length; and
  c. said partial ball runs being formed by arcuate shoulders joining the outboard edges of said base plate and said reduced width portions.

3. The assembly of claim 1 wherein said guide member
  A. is substantially flat and rectangular in plan;
  B. has opposed arcuate ends;
  C. has a width dimension equal to the widest width dimension of said base plate; and
  D. has a length dimension that is less than the length dimension of said reduced width portions of said base plate.

4. The assembly of claim 1 wherein said body portion

A. has opposed reduced width undercut portions extending through a portion of its length;
  B. said partial ball runs being formed by arcuate shoulders joining the outboard edges of said body portion and said reduced width portions and the upper wall of said undercut portion; and
  C. the length of said reduced width undercut portions being slightly greater than the length of said guide member.

5. The assembly of claim 1 wherein said cover plate

A. is U-shaped in cross-sectional configuration; and

B. has inturned flanges on the outboard ends of its opposed legs.

* * * * *